United States Patent
Bakather et al.

(10) Patent No.: US 9,296,625 B2
(45) Date of Patent: Mar. 29, 2016

(54) BENZENE REMOVAL USING CARBON NANOTUBES IMPREGNATED WITH IRON

(71) Applicant: King Fahd University of Petroleum and Minerals, Dhahran (SA)

(72) Inventors: Omer Yahya Bakather, Dhahran (SA); Muataz Ali Atieh, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 202 days.

(21) Appl. No.: 14/103,949

(22) Filed: Dec. 12, 2013

(65) Prior Publication Data

US 2015/0166365 A1    Jun. 18, 2015

(51) Int. Cl.
| | |
|---|---|
| C02F 1/28 | (2006.01) |
| C01B 31/02 | (2006.01) |
| B01J 20/32 | (2006.01) |
| B82Y 40/00 | (2011.01) |
| C02F 101/32 | (2006.01) |
| B82Y 30/00 | (2011.01) |

(52) U.S. Cl.
CPC ............ *C02F 1/283* (2013.01); *B01J 20/3295* (2013.01); *C01B 31/0253* (2013.01); *B82Y 30/00* (2013.01); *B82Y 40/00* (2013.01); *C02F 1/281* (2013.01); *C02F 1/288* (2013.01); *C02F 2101/322* (2013.01); *C02F 2305/08* (2013.01); *Y10S 977/846* (2013.01); *Y10S 977/903* (2013.01)

(58) Field of Classification Search
CPC .......... C02F 1/281; C02F 1/283; C02F 1/288; C02F 2101/322; C02F 2305/08
See application file for complete search history.

(56) References Cited

FOREIGN PATENT DOCUMENTS

| WO | 2005/085130 | 9/2005 |
|---|---|---|
| WO | 2010/077441 | 7/2010 |

OTHER PUBLICATIONS

Lu et al, Surface modification of carbon nanotubes for enhancing BTEX adsorption from aqeuous liquids, Jan. 2008, Applied Science, vol. 254, pp. 7035-7041.*

Yu et al, Magnetic carbon nanotubes synthesis by Fenton's reagent method and their potential application for removal of azo dye from aqueous solution, Apr. 2012, Journal of Colloid and Interace Science, vol. 378, pp. 175-183.*

Formality Examination Report issued Dec. 9, 2014 in Saudi Arabian Patent Application No. 114350782 (submitting English translation only).

S. Song, et al. "High Catalytic Activity and Selectivity for Hydroxylation of Benzene to Phenol over Multi-Walled Carbon Nanotubes Supported $Fe_3O_4$ Catalyst", Applied Catalysis A: General, vol. 375, Issue 2, pp. 265-271. (Mar. 1, 2010).

(Continued)

*Primary Examiner* — Matthew O Savage
(74) *Attorney, Agent, or Firm* — Oblon, McClelland, Maier & Neustadt, L.L.P.

(57) ABSTRACT

Multi-walled carbon nanotubes impregnated with iron nanoparticles are synthesized. The multi-walled carbon nanotubes are used as sorbents to remove benzene from water. The removal of benzene increases with the increase of impregnated iron percent in the multi-walled carbon nanotube.

13 Claims, 2 Drawing Sheets

(56) References Cited

OTHER PUBLICATIONS

Y., Li, et al. "Different Morphologies of Carbon Nanotubes Effect on the Lead Removal from Aqueous Solution", Diamond and Related Materials, vol. 15, Issue 1, pp. 90-94. (Jan. 2006).

J. Jin, et al. "Magnetic Fe Nanoparticle Functionalized Water-Soluble Multi-walled Carbon Nanotubles towards the Preparation of Sorbent for Aromatic Compounds Removal", Chemical Communication, pp. 386-388. Dec. 2006.

J. Hu, et al. "Removal of 1-naphthylamine from aqueous solution by multiwall carbon nanotubes/iron oxides/cyclodextrin composite", Journal of Hazardous Materials, vol. 185, Issue 1, pp. 463-471. (Jan. 15, 2011).

\* cited by examiner

BENZENE REMOVAL USING CARBON NANOTUBES IMPREGNATED WITH IRON

BACKGROUND OF THE INVENTION

1. Technical Field

The present invention relates to a multi-walled carbon nanotube impregnated with iron nanoparticles, a method of synthesizing the multi-walled carbon nanotube, and a method in which the multi-walled carbon nanotube is used for the removal of benzene from water.

2. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Aromatic hydrocarbons (AHs) such as benzene are found in air mainly because of emissions from fuel combustion and vehicle exhausts and other sources. Benzene is a volatile organic compounds and is considered to be a hazardous air pollutant (U.S. Environmental Protection Agency. 2002. "Toxicological Review of Benzene (Noncancer Effects)." http://www.epa.gov/iris/toxreview/0276-tr.pdf—incorporated herein by reference in its entirety). Benzene is a flammable, colorless liquid with a gasoline-like odor (U.S. Centers for Disease Control, (ATSDR). 1997. "Toxicological Profile for Benzene." http://www.atsdr.cdc.gov/toxprofiles/tp3.html incorporated herein by-reference in its entirety). It is typically used as a solvent and raw material in a broad variety of industrial processes (Wibowo N., L. Setyadhi, D. Wibowo, J. Setiawan, S. Ismadji: *Adsorption of benzene and toluene from aqueous solutions onto activated carbon and its acid and heat treated forms*: Influence of surface chemistry on adsorption, Journal of Hazardous Materials, 146 (1-2), 237-42 (2007)—incorporated herein by reference in its entirety). Currently, due in large part to vehicle emissions, high concentrations of benzene exist in ambient air and indoor air.

Benzene is found most often in groundwater as a results of leaks in underground pipelines, storage tanks, unintended spills, unsuitable waste disposal practices and leaching from landfills (Shim H., et al., *A continuous fibrous-bed bioreactor for BTEX biodegradation by a co-culture Pseudomonas putida and Pseudomonas fluorescens*, Advances in Environmental Journal of Research, 7(1), 203-216 (2002)—incorporated herein by reference in its entirety). Benzene may be a cause a lot of health side effects to humans such as leukemia, central nervous system depression, skin and sensory irritation, liver and blood systems, cancer and disturbance of the kidney, reduced weight gain, reducing numbers of blood-forming cells etc. (Murray, F. J., et al. 1979. "Embryotoxicity of inhaled benzene in mice and rabbits." Am. Ind. Hyg. Assoc. J. 40(11):993-998; Keller, K. A., and C. A. Snyder. 1988. "Mice exposed in utero to 20 ppm benzene exhibit altered numbers of recognizable hematopoietic cells up to seven weeks after exposure." Fundam. Appl. Toxicol. 10(2):224-232; Keller, K. A., and C. A. Snyder. 1986. "Mice exposed in utero to low concentrations of benzene exhibit enduring changes in their colony forming hematopoietic cells." Toxicology 42(2-3):171-181—each incorporated herein by reference in its entirety).

The U.S. EPA has set the maximum concentration of benzene at 5 µg/l for drinking water.

There are several processes to treat and remove benzene from water. The adsorption of benzene on carbon nanotubes (CNT) has attracted great interest because of the unique physical and chemical structure properties of CNTs CNTs showed large adsorption capacity for organic pollutants due to their pore structure and the existence of a wide spectrum of surface functional groups. The adsorption mechanism of benzene on CNTs could attributed to the $\pi$-$\pi$ electron donor-acceptor interaction between the aromatic ring of benzene and toluene and the surface carboxylic groups of CNTs (Lu C., F. Su, S. Hu: Surface modification of carbon nanotubes for enhancing BTEX adsorption from aqueous solutions, Applied Surface Science Journal, 254 (21), 7035-7041 (2008)—incorporated herein by reference in its entirety).

It has been found that CNTs are more effective for the removal of natural organic matter (NOM) than activated carbon (Lu C., F. Su: Adsorption of natural organic matter by carbon nanotubes, Separation and Purification Technology Journal, 58 (1), 113-121 (2007)—incorporated herein by reference in its entirety). Lu et al. used surface modification of carbon nanotubes to enhance benzene and toluene adsorption from aqueous solutions. The NaOCl-oxidized CNTs have superior adsorption performance toward benzene and toluene compared with many types of carbon and silica adsorbents reported in the literature (Lu C., F. Su, S. Hu: Surface modification of carbon nanotubes for enhancing BTEX adsorption from aqueous solutions, Applied Surface Science Journal, 254 (21), 7035-7041 (2008)—incorporated herein by reference in its entirety).

Su et al. employed multi-walled carbon nanotubes (MWCNTs) that were oxidized by sodium hypochlorite (NaOCl) solution to enhance the adsorption of benzene and toluene in an aqueous solutions (Su F., C. Lu, S. Hu: *Adsorption of benzene, toluene, ethylbenzene and p-xylene by NaOCl-oxidized carbon nanotubes*, Colloids and Surfaces Journal A: Physicochemical and Engineering Aspects, 353 (1), 83-91(2010)—incorporated herein by reference in its entirety).

BRIEF SUMMARY OF THE INVENTION

The foregoing paragraphs have been provided by way of general introduction, and are not intended to limit the scope of the following claims. The described embodiments, together with further advantages, will be best understood by reference to the following detailed description taken in conjunction with the accompanying drawings.

In one embodiment of the present invention a multi-walled carbon nanotube impregnated with iron is synthesized via an impregnation method.

In another embodiment, the multi-walled carbon nanotube is impregnated with 5-20% weight iron.

In another embodiment, the multi-walled carbon nanotube impregnated with iron is used as a sorbent to remove benzene from water.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
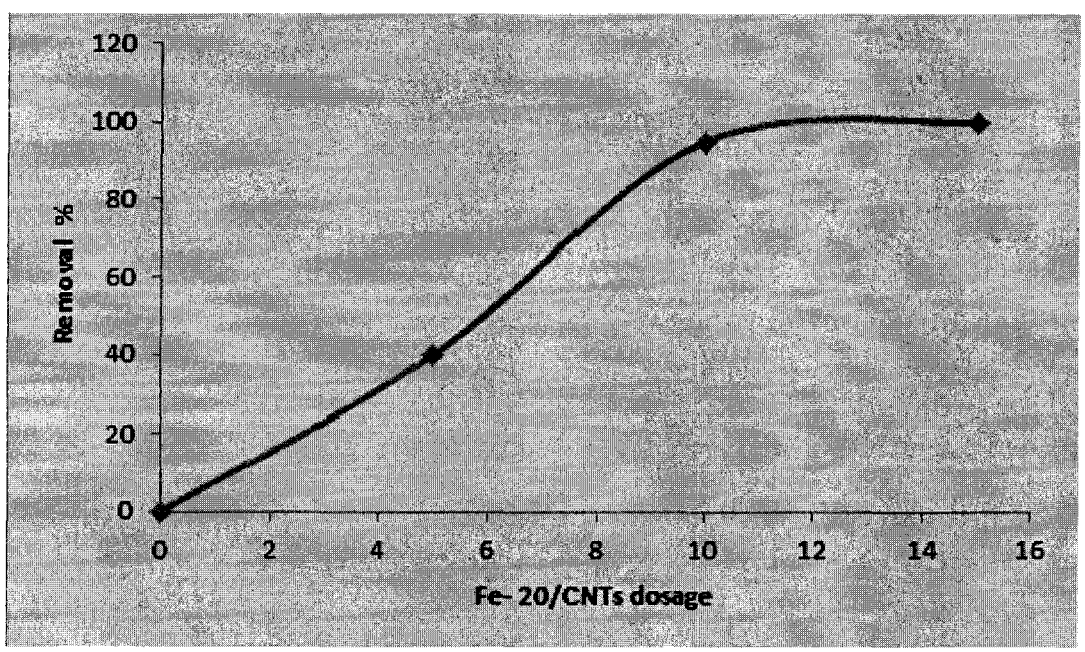
FIG. 1 is a graph illustrating the effect of dosage of Fe-20/CNTs on percentage removal of benzene.

Referring now to the drawings, wherein like reference numerals designate identical or corresponding parts throughout the several views.

The present invention relates to a method for obtaining a multi-walled carbon nanotube (MWCNT) impregnated with iron. The multi-walled carbon nanotube (MWCNT) is preferably at least 95% pure. The MWCNT has an outside diameter of 20-40 nm, preferably 10-20 nm, or 5-10 nm. The MWCNT includes an inside diameter of 10-20 nm, preferably 5-10 nm, or 2.5-5 nm. Preferably, the MWCNT contains an outside diameter in the range of 10-20 nm and an inside diameter in the range of 5-10 nm. The length of the MWCNT is in the range of 20-60 μm, preferably 10-30 μm, or 5-15 μm. Preferably, the length of the nanotubes is in the range of 10-30 μm. The tubes of the MWCNT may be capped or uncapped. Preferably, the MWCNTs do not have side holes, are capped, and/or contain only carbon and hydrogen atoms.

First, an iron salt is dissolved in a solution comprising water, the water may further comprise a hydrocarbon based molecule with at least one —OH functional group (e.g., an alcohol compound). Iron salts include but are not limited to iron (III) phosphate ($FePO_4$), iron (III) sulfate ($Fe_2(SO_4)_3$), iron (III) nitrate ($Fe(NO_3)_3$), iron (III) chloride ($FeCl_3$), and iron (II) oxalate ($Fe(C_2O_4)$). Preferably, iron (III) nitrate is used as the iron salt. The alcohol compound includes but is not limited to methanol ($CH_3CH_2OH$), propanol ($CH_3CH_2CH_2OH$), butanol ($C_4H_9OH$), pentanol ($C_5H_{11}OH$), hexanol ($C_6H_{13}OH$), heptanol ($CH_3(CH_2)_6OH$), octanol ($CH_3(CH_2)_7OH$), nonanol ($CH_3(CH_2)_8OH$), decanol ($C_{10}H_{21}OH$) and any isomers thereof. Preferably, the alcohol compound is ethanol.

For example, iron (III) nitrate is added at a mass range of 1-10 g, 3-8 g, 3.2-7.8 g, or 3.5-7.3 g per 100 grams of solution, preferably these amounts of the iron (III) salts are dissolved in 100-300 mL, 150-250 mL, or 175-225 mL of a water/alcohol solution. Preferably, 1.8 g or 1.0-2.0 g of iron (III) nitrate is dissolved in 200 mL of an alcohol solution. The solution preferably contains a mass concentration of iron (III) nitrate in the range of 0.001-0.8 g/mL, 0.002-0.7 g/mL, 0.003-0.5 g/mL, 0.004-0.4 g/mL, 0.005-0.3 g/mL, 0.01-0.2 g/mL, 0.015-0.1 g/mL, 0.025-0.9 g/mL, 0.05-0.6 g/mL, or 0.1-0.5 g/mL. Preferably, the mass concentration of the iron (III) nitrate in the alcohol solution is about 0.009 g/mL. The mixture of alcohol solution and iron (III) nitrate is then mixed with multi-walled carbon nanotubes including a mass range of 4-6 g, 4.2-5 g, or 4.5-4.8 g. Preferably, 4.75 g of MWCNT is used so that the MWCNT is impregnated with 5-20 wt %, 6-18 wt %, 7-16 wt %, 8-14 wt %, or 10-12 wt % iron nanoparticles.

The solution of MWCNT, optionally alcohol, and iron (III) salt is mixed to create a homogeneous mixture of the compounds. Manual methods and mechanical methods may be used to mix the solution. Manual methods of mixing may be used to mix the solution including but not limited to swirling the solution by hand and by placing a magnetic stir bar in the solution and stirring with a magnetic stir plate. Mechanical methods include but are not limited to sonicating the solution using an ultrasonic bath or an ultrasonic probe or ultrasonicating the solution. Preferably, ultrasonication is used. Ultrasonication in the presence of a solvent enhances the absorbivity of the iron (III) nitrate nanoparticles into the MWCNT by improving their dispersion within the solvent. The solution is ultrasonicated at a frequency of >20 kHz, more preferably between 20-30 kHz. The ultrasonicator functions at a power within the range of 100-1500 W, 200-1300 W, or 300-800 W. More preferably, the ultrasonicator functions at a power between 300-800 W. The solution is ultrasonicated for a time period ranging from 10-50 minutes, 20-40 minutes, and 25-35 minutes. Preferably the solution is ultrasonicated for 30 minutes.

Following the mixing, the solution undergoes a heating treatment. The solution is put in a beaker and heated in a furnace at a temperature range of 60-80° C. over a time period ranging from 10-20 hours, 11-18 hours, or 12-15 hours. Preferably the solution is heated over a time period of 12 hours. Heating the solution evaporates the remaining liquids in the solution and forms a dry residue.

Following heating, the dried residue is subject to calcination treatment. Calcination can be carried out in shaft furnaces, rotary kilns, multiple hearth furnaces, and/or fluidized bed reactors. Calcination is conducted over a time period of 1-4 hours, 1.25-3.5 hours, or 1.5-3.25 hours at a temperature ranging from 300-600° C., 325-650° C., or 350-500° C. Preferably calcination is conducted for about 3 hours at a temperature of 350° C.

The resulting material contains a mixture of MWCNTs and iron, preferably in the form of $Fe_2O_3$. The MWCNTs preferably contain 5-25%, 7-22%, 10-20%, 12-18%, 14-16% or about 15% of iron based on the total weight of the MWCNTs on which the iron is adsorbed.

The resulting iron-impregnated MWCNTs contain atoms of Fe(III) mainly adsorbed onto the surface of the carbon nanotubes. The iron is preferably present as $Fe_2O_3$. Some iron may be present inside the nanotubes, preferably all of the iron is adsorbed on the outside walls of the carbon nanotubes. The iron particles are preferably evenly dispersed on the surface of the outer walls of the MWCNTs.

Example

Preparation of Multi-Walled Carbon Nanotube Impregnated with Iron

Iron (III) nitrate, benzene (C6H6), nitric acid, sodium hydroxide, ethanol were purchased from Sigma-Aldrich Company without pretreatment.

Multiwalled Carbon Nanotubes were synthesized using Floating Catalyst Chemical Vapor Deposition (FC-CVD) reactor. The experimental set-up used and reaction conditions are the same as reported by Muataz et al. (Muataz Ali Atieh, et al.; "Effect of Carboxylic Functional Group Functionalized on Carbon Nanotubes Surface on the Removal of Lead from Water," Bioinorganic Chemistry and Applications, vol. 2010, Article ID 603978, 9 pages, 2010. doi: 10.1155/2010/603978 (a); Muataz Ali Atieh, et al., "Removal of Chromium (III) from Water by Using Modified and Nonmodified Carbon Nanotubes," Journal of Nanomaterials, vol. 2010, Article ID 232378, 9 pages, 2010. doi: 10.1155/2010/232378 (b).— each incorporated herein by reference in its entirety).

About 1.8 grams of iron (III) nitrate was dissolved in 200 ml of ethanol solution and mixed with 4.75 grams of multi-walled carbon nanotubes (MWCNTs) to prepare carbon nanotubes impregnated with iron nanoparticles in an amount of 5 wt. %. The mixture of MWCNTs and iron (III) nitrate was mixed using ultrasonic mixer for 30 minutes. Then, the resulting suspension was transferred to a beaker and placed in a furnace at 60-80° C. over night to evaporate the ethanol. Finally, the product was put in the oven at 350° C. for 3 hours for calcination. The same procedures were followed to produce MWCNTs impregnated with iron nanoparticles in amounts of 10 wt. % and 20 wt. % using 3.6 and 7.2 grams of iron (III) nitrate to mix with 4.5 and 4 grams of MWCNTs respectively.

Freundlich and Langmuir isotherms relate the coverage or adsorption of molecules on a solid surface to gas pressure or concentration of a medium above the solid surface at a fixed temperature. This technique was applied to the Multi-walled carbon nanotube impregnated with iron made as described above.

The experimental data benzene adsorption on Fe-20/CNTs at pH=6 could be approximated by the isotherm models of Langmuir (1) and Freundlich (2)

$$q = \frac{q_m K_L C}{1 + K_L C} \quad (1)$$

Where C is the equilibrium benzene concentration (mg/l), q is the amount adsorbed (mg/g) and $q_m$, and $K_L$ are Langmuir constants related to adsorption capacity and energy of adsorption, respectively.

$$q = K_F C^{1/n} \quad (2)$$

Where $K_F$ and n are Freundlich constants related to adsorption capacity and adsorption intensity, respectively. The equations (1) and (2) can be written as:

$$\frac{C}{q} = \frac{1}{(K_L q_m)} + \frac{C}{q_m} \quad (3)$$

$$\log q = \frac{1}{n} \log C + \log K_F \quad (4)$$

It can be seen from Table 1 that both Langmuir and Freundlich models show good agreement with the experimental data, with the correlation coefficient values of 0.93 and 0.98 respectively. The equilibrium data were fitted very well to all sorption isotherms. And the Freundlich isotherm was the best fit for the data. The good correlation coefficient of Freundlich isotherm also indicates that benzene ring strongly adsorbed to the surface of Fe-20/CNTs. Therefore, it is verified that Fe-20/CNTs have great potential to be a good adsorbent for the removal of benzene in water treatment.

TABLE 1

Parameters of Langmuir and Freundlich adsorption isotherm models for benzene

| Langmuir | | | Freundlich | | |
|---|---|---|---|---|---|
| $q_m$ (mg/g) | $K_L$ (Lmg$^{-1}$) | $R^2$ | n | $K_F$ (mg$^{(1-1/n)}$ L$^{1/n}$g$^{-1}$) | $R^2$ |
| 83.3 | 0.059 | 0.93 | 0.62 | 1.1 | 0.98 |

In another embodiment of the invention, the MWCNT impregnated with iron is used as a sorbent to adsorb benzene from water. The concentration of the benzene in water is not limited but may be for example 10-1,000 ppm, 20-900 ppm, 30-800 ppm, 40-700 ppm, 50-600 ppm, 60-500 ppm, 70-400 ppm, 80-300 ppm, or 90-200 ppm.

In the method, benzene dissolved in an aqueous composition is separated and removed from water. A stock solution is prepared by dissolving benzene into deionized water. The pH of the solution is adjusted so that the solution is maintained at a pH of 6. If the pH of the solution is above 6 an acid may be added including but not limited to nitric acid (HNO$_3$), oxalic acid (H$_2$C$_2$O$_4$), hydrofluoric acid (HF), hydrochloric acid (HCl), citric acid (H$_3$C$_6$H$_5$O$_7$), carbonic acid (CH$_2$O$_3$), or boric acid (H$_3$BO$_3$). Preferably, 0.1 M nitric acid is used to maintain a pH of 6 in the solution. If the pH of the solution is below 6 a base may be added including but not limited to sodium hydroxide (NaOH), ammonia (NH$_3$), calcium hydroxide (Ca(OH)$_2$), lithium hydroxide (LiOH), or potassium hydroxide (KOH). Preferably, 0.1 M NaOH is used to maintain a pH of 6 in the solution.

The solution is then shaken by way of rotary shaker or by hand and analyzed by Gas Chromatography system.

Example

MWCNT Used as a Sorbent in Removal of Benzene from Water

The stock solution was prepared by dissolving proper amount of benzene in deionized water depending on the required concentration. The pH of the stock solution was adjusted to 6 by using 0.1 M Nitric Acid or 0.1 M NaOH.

The experiments of the batch mode adsorption were carried out at room temperature using a volume of 50 ml benzene solution with pH 6 in each run and put in volumetric flasks to investigate the effect of MWCNTs dosage, impregnation percent and initial concentration of benzene on the removal of benzene. The flasks were covered and mounted on the mechanical rotary shaker (MPI Lab Shaker) and shaken. The initial and final concentrations were analyzed by using Gas Chromatography system (GC).

The pure MWCNTs showed the maximum adsorption of benzene was 85% at pH of 6. However, impregnating the MWCNTs with iron (Fe) improved the benzene removal to reach 88%, 90% and 95% using 5, 10 and 20 percent of Fe impregnated respectively, using 10 mg of each of the adsorbents with initial concentration of benzene=1 mg/l, a contact time of 24 hr and sn agitation speed of 150 rpm.

The MWCNTs impregnated with 20% of iron (Fe-20/CNTs) were selected since it showed the highest removal capacity. The batch adsorption experiments were carried out by using three amounts of Fe-20/CNTs (5-10-15) mg while the pH, agitation speed and contact time were fixed at 6, 150 rpm and 24 hr. The adsorption capacity was increased with increased in adsorbent dosage until 100% removal was reached using 15 mg of the dosage as shown in FIG. 1. FIG. 1 is a graph illustrating the effect of dosage of Fe-20/CNTs on percentage removal of benzene (pH=6, initial concentration=1 mg/l, contact time=24 hr, agitation speed=150 rpm).

Figure 2:
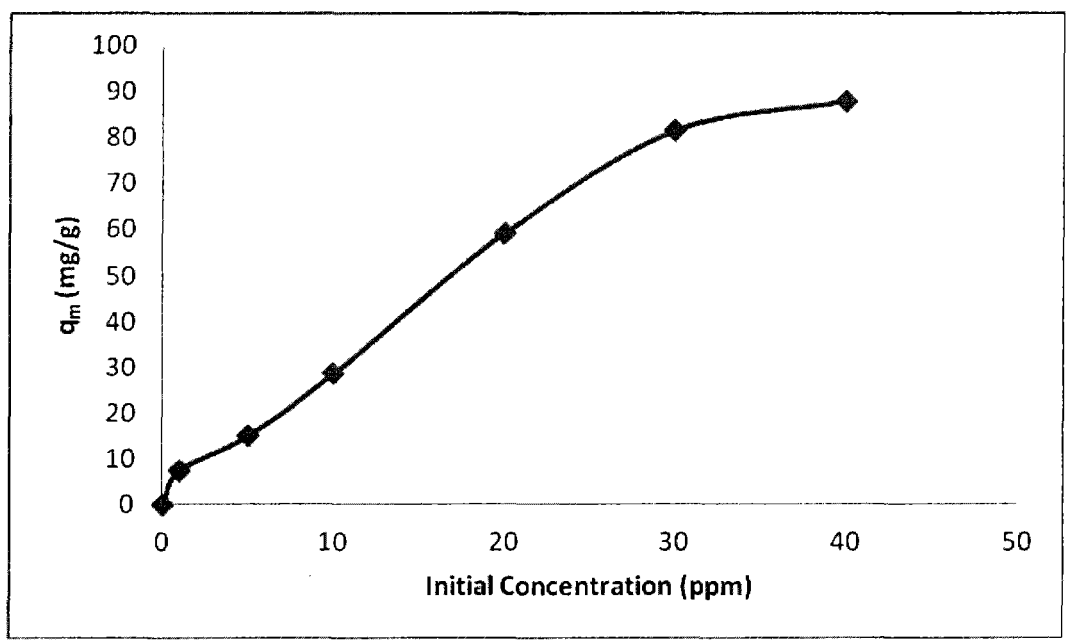
FIG. 2 is a graph illustrating the effect of initial concentration of benzene on adsorption capacity of Fe-20/CNT.

Adsorption capacity of Fe-20/CNT increased with increasing initial concentration of benzene due to increased driving force of mass transfer of benzene molecules towards the Fe-20/CNTs surface. The highest adsorption capacity was about 90 mg/g using initial concentration 40 ppm as shown in FIG. 2. FIG. 2 is a graph illustrating the effect of initial concentration of benzene on adsorption capacity of Fe-20/CNT at 150 rpm, pH=6, Fe-20/CNT dosage=10 mg, time=24 hr.

The foregoing discussion discloses and describes exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A method for removing benzene from a benzene-containing aqueous composition, comprising:
   contacting an adsorbent with the benzene-containing aqueous composition;
   wherein the adsorbent comprises multi-walled carbon nanotubes having an outside diameter of 10-20 nm and an inside diameter of 5-10 nm, with iron(III) oxide nanoparticles impregnated on outside walls of the multi-walled carbon nanotubes.

2. The method of claim 1, wherein the contacting is carried out at a pH of 6.

3. The method of claim 1, wherein the multi-walled carbon nanotubes are impregnated with 5-25% by weight of the iron(III) oxide nanoparticles based on the total weight of the iron nanoparticles and the multi-walled carbon nanotubes.

4. The method of claim 3, wherein the multi-walled carbon nanotubes are impregnated with 5-15% by weight of the iron(III) oxide nanoparticles based on the total weight of the iron(III) oxide nanoparticles and the multi-walled carbon nanotubes.

5. The method of claim 1, wherein the benzene is present in the benzene-containing aqueous composition at a concentration of 10-1,000 ppm.

6. The method of claim 1, in which 100% benzene is removed from benzene-containing aqueous composition with 15 mg of the multi-walled carbon nanotubes impregnated with 20% of the iron(III) oxide nanoparticles by weight based on the total weight of the iron nanoparticles and the multi-walled carbon nanotubes, the benzene-containing aqueous composition having a volume of 50 ml, an initial benzene concentration of 1 mg/L and a pH of 6.

7. The method of claim 1, wherein the multi-walled carbon nanotubes have a length of 20-60 Lm.

8. The method of claim 1, wherein the multi-walled carbon nanotubes comprise no side holes.

9. The method of claim 1, wherein the multi-walled carbon nanotubes are capped.

10. The method of claim 1, wherein the multi-walled carbon nanotubes consist of carbon and hydrogen atoms.

11. The method of claim 1, wherein the contacting is carried out at 150 rpm.

12. The method of claim 1, wherein the contacting is carried for 24 h.

13. The method of claim 1, wherein the multi-walled carbon nanotubes are impregnated with 14-16% by weight of the iron(III) oxide nanoparticles based on the total weight of the iron nanoparticles and the multi-walled carbon nanotubes.

* * * * *